(12) United States Patent
Streichardt et al.

(10) Patent No.: US 10,442,131 B2
(45) Date of Patent: Oct. 15, 2019

(54) EDGE STRIP (71) Applicant: MKT Moderne Kunststoff-Technik Gebruder Eschbach GmbH, Ohrdruf (DE)

(72) Inventors: Thomas Streichardt, Warendorf (DE); Naim Murici, Galdbeck (DE)

(73) Assignee: MKT Moderne Kunstoff-Technik Gebruder Eschbach GmbH, Ohrdruf (DE)

( * ) Notice: Subject to any disclaimer, the term of this patent is extended or adjusted under 35 U.S.C. 154(b) by 320 days.

(21) Appl. No.: 15/107,686

(22) PCT Filed: Dec. 22, 2014

(86) PCT No.: PCT/EP2014/079016
§ 371 (c)(1),
(2) Date: Jun. 23, 2016

(87) PCT Pub. No.: WO2015/097163
PCT Pub. Date: Jul. 2, 2015

(65) Prior Publication Data
US 2016/0318237 A1  Nov. 3, 2016

(30) Foreign Application Priority Data

Dec. 23, 2013 (DE) .................. 10 2013 022 086

(51) Int. Cl.
*B32B 3/10* (2006.01)
*B29C 63/00* (2006.01)
(Continued)

(52) U.S. Cl.
CPC .......... *B29C 63/0017* (2013.01); *B29C 48/21* (2019.02); *B29C 63/0026* (2013.01); *B29C 65/08* (2013.01); *B29C 65/16* (2013.01); *B29C 65/4815* (2013.01); *B29C 66/7392* (2013.01); *C08L 23/12* (2013.01); *C09J 123/12* (2013.01);
(Continued)

(58) Field of Classification Search
None
See application file for complete search history.

(56) References Cited

U.S. PATENT DOCUMENTS

| 3,220,966 A | 11/1965 | Flanagan | |
|---|---|---|---|
| 2004/0127614 A1* | 7/2004 | Jiang | C08F 10/00 524/270 |
| 2010/0227128 A1* | 9/2010 | Kramer | A47B 96/201 428/195.1 |

FOREIGN PATENT DOCUMENTS

| DE | 102010014776 A1 * | 9/2011 | ........... A47B 13/083 |
|---|---|---|---|
| DE | 20 2013 011790 U1 | 7/2014 | |

(Continued)

OTHER PUBLICATIONS

Machine translation of DE-102010014776-A1 (Year: 2011).*

*Primary Examiner* — Christopher M Polley
(74) *Attorney, Agent, or Firm* — Olson & Cepurtis, Ltd.

(57) ABSTRACT

The invention relates to an edge strip, especially for panels of pieces of furniture, comprising a hot-melt layer which consists of at least one easy-flow polyolefin and the rheological behavior of which can be controlled by means of the melt flow rates of the polyolefins used in hot-melt layer. The invention further relates to a method for producing an edge strip of said type as well as to a panel for pieces of furniture that is connected to an edge strip of said type.

23 Claims, 1 Drawing Sheet

(51) Int. Cl.
    *B29C 48/21*     (2019.01)
    *B29C 65/48*     (2006.01)
    *B29C 65/08*     (2006.01)
    *B29C 65/16*     (2006.01)
    *B29C 65/00*     (2006.01)
    *C09J 123/12*     (2006.01)
    *C08L 23/12*     (2006.01)
    *B29K 23/00*     (2006.01)
    *B29L 31/44*     (2006.01)

(52) U.S. Cl.
    CPC ........... *B29C 66/112* (2013.01); *B29C 66/114* (2013.01); *B29C 66/7487* (2013.01); *B29K 2023/10* (2013.01); *B29K 2023/14* (2013.01); *B29L 2031/44* (2013.01)

(56) References Cited

FOREIGN PATENT DOCUMENTS

| | | |
|---|---|---|
| EP | 1163864 A1 | 12/2001 |
| EP | 2327750 A1 | 6/2011 |
| EP | 2 366 540 A1 | 9/2011 |
| WO | 2014/194094 A2 | 12/2014 |

\* cited by examiner

EDGE STRIP

CROSS-REFERENCE TO RELATED APPLICATIONS

This application is a U.S. National Stage of PCT/EP2014/079016, filed Dec. 22, 2014, which claims priority of German Patent Application No. 10 2013 022 086.6, filed Dec. 23, 2013, both incorporated herein by reference.

The invention relates to an edging strip in particular for furniture panels, comprising a melt layer which is composed of at least one free flowing polyolefin and the rheology of which can be controlled by way of the melt flow index of the polyolefins used in the melt layer. The invention further relates to a process for the production of said edging strip, and also to a furniture panel bonded to said edging strip.

Thermoplastic edgings are prior art for the sealing of exposed particle board, in particular fronts, worktops, carcasses, shelves and sidewall systems. Examples of material used for the edgings are PVC plastics, ABS plastics, PP plastics and PMMA plastics. Usual thicknesses of these edging strips are from 0.4 to 3 mm.

The expressions "edging strip" and "edge banding" are used as synonyms for the process of the present invention.

According to the prior art, these thermoplastic edgings can be adhesive-bonded to particle board by using a hot-melt adhesive. The adhesive bond between the edging strip and the cut edge of the particle board here covers the entire surface.

The prior art describes edging strips which comprise a melt layer, intended to reduce the cost associated with the application of the hot-melt adhesive during the processing of these thermoplastic edgings. This permits welding of the edging strip to a wood-based material by way of example by using laser technology or other methods of introducing energy.

With a view to allowing good adhesion between the edging strip and the wood-based material, great importance is attributed here to the polarity of the plastics material on which the melt layer is based. DE 20 2007 011 911 U1 describes an edging strip comprising a melt layer where the melt layer comprises both polar and nonpolar fractions in the structure of a molecule. This measure is intended to achieve particularly effective adhesive bonding between the edging strip and the wood-based material. The melt layer here is typically based on a graft copolymer, in particular a maleic anhydride-grafted polypropylene.

This type of melt layer has attendant disadvantages: the requirement to use graft copolymerization to modify the polymer material in the melt layer leads to increased cost. When these materials are used moreover there are often points of weakness in the resultant adhesive bond between the edging strip and a wood-based material, and in particular at the corner joints (edging/edging weld) this leads to inadequate resistance to water and to water vapor.

It was therefore an object of the present invention to provide an edging strip which, when compared with the prior art, has economic advantages while permitting better adhesive bonding.

The object of the invention is achieved via an edging strip as claimed in the teaching of claim 1, and the dependent claims comprise at least advantageous embodiments and developments. The object is moreover also achieved via a furniture panel as claimed in claim 26 or 27 and a process as claimed in claim 28.

An edging strip is accordingly provided, in particular for furniture panels, comprising a melt layer, where the melt layer comprises a thermoplastic polymer composed of nonpolar monomer units. It is preferable that the thermoplastic polymer composed of nonpolar monomer units is a polyolefin.

Surprisingly, it has been found that, contrary to the opinion prevailing among persons skilled in the art that formation of a good adhesion bond between an edging strip and a wood-based material requires a melt layer based on a polymer comprising both polar and nonpolar fractions in the structure of a molecule, it is possible to achieve excellent results with an edging strip whose melt layer comprises a thermoplastic polymer composed solely of nonpolar monomer units. It has been found, contrary to the teaching of DE 20 2007 011 911 U1, that this type of edging strip can provide an excellent bond between an edging strip and a wood-based material.

The expression "nonpolar monomer units" is known to the person skilled in the art. For the purposes of the present invention, the expression is intended to describe thermoplastic polymer composed of nonpolar monomer units, in particular a thermoplastic polymer which is a homopolymer or copolymer of polyolefins.

The term polarity, when used in chemistry, means formation of separate charge centers which are produced via charge displacement within groups of atoms, and the effect of which is that a group of atoms is no longer electrically neutral. The electrical dipole moment is a measure of the polarity of a molecule. A polar substance is composed of polar molecules which feature a permanent electrical dipole moment. In contrast, a nonpolar or apolar molecule has no permanent dipole moment.

A particularly preferred embodiment of the present invention provides an edging strip, in particular for furniture panels, comprising a melt layer which comprises a thermoplastic polyolefin.

A very particularly preferred embodiment of the invention provides an edging strip comprising a melt layer which is composed of at least one thermoplastic polyolefin or the polymer basis of which is composed of at least one thermoplastic polyolefin, and which optionally comprises other components, in particular in the form of pigments, fillers and additives.

It is preferable that the thermoplastic polyolefin is a homo- or copolymer of ethylene, propylene and/or butylene. It is most preferable that the thermoplastic olefin is a homopolymer of propylene or a copolymer of polypropylene and polyethylene.

Surprisingly, it has been found that this type of edging strip gives excellent results when (adhesive-)bonded to a wood-based material. The (adhesive-)bonding here can be achieved with introduction of any desired type of energy. In a particularly preferred embodiment, the (adhesive-)bonding of the edging strip to a wood-based material is achieved via exposure to laser, exposure to hot air, exposure to plasma, exposure to ultrasound, or via any desired other technology for introduction of energy. It is most preferable that the (adhesive-)bonding of the edging strip to the wood-based material is achieved via exposure to a laser.

In the case of laser welding, the laser radiation is focused by means of suitable optics, thus melting the melt layer. This permits welding of the edging strip to a substrate. In a similar method, it is also possible to use plasma to melt the melt layer.

In the case of ultrasound welding, the energy required for welding is generated via ultrasound vibrations. The ultrasound vibrations induce movement of the molecules of the polyolefin material at the appropriate sites, causing friction which in turn leads to melting of the plastic.

Another possible method for achieving this type of melting of the polyolefin material for the purposes of welding is the controlled use of hot air.

There are moreover also other known processes which can be used for melting of the polyolefin of the melt layer via introduction of energy, in order to permit subsequent welding to a substrate.

It has been found that the processing properties, in particular the flowability, of the melt layer of the edging strip of the invention can be controlled very effectively by way of the melt flow index of the polymer on which the melt layer is based. In a preferred embodiment the melt flow index (MFI) of the polymer on which the melt layer is based is above 25 g/10 min, preferably 100 g/10 min or higher, particularly preferably above 100 g/10 min (in accordance with ISO 1133, 230° C., 2.16 kg). Particularly good results were achieved when the melt flow index (MFI) of the thermoplastic polymer on which the melt layer is based is >=1000 g/10 min (in accordance with ISO 1133, 230° C., 2.16 kg), in particular from 1000 to 1500 g/10 min (in accordance with ISO 1133, 230° C., 2.16 kg) and particularly preferably 1200 g/10 min (in accordance with ISO 1133, 230° C., 2.16 kg).

Thermoplastic polymers having the abovementioned melt flow index values or melt flow index values in the abovementioned ranges have the advantageous property of being free-flowing.

It has in particularly been found that the use of thermoplastic polymers with melt flow index <100 g/10 min (in accordance with ISO 1133, 230° C., 2.16 kg) in the melt layer has a disadvantageous effect on the processing properties of the edging strip of the invention, because the melt layer is then no longer sufficiently free-flowable. This is in particular true when the polymer basis of the melt layer is composed of thermoplastic polymers which are composed of nonpolar monomers.

A preferred embodiment of the invention therefore provides an edging strip comprising a melt layer whose polymer basis is composed of at least one free-flowing thermoplastic polymer, preferably of at least one free-flowing polyolefin, where the melt layer optionally also comprises other components, in particular in the form of pigments, fillers and additives.

In a very particularly preferred embodiment, the melt layer is therefore composed of a polymer basis that is completely nonpolar.

It has been found that the selection of these MFI values for the thermoplastic polymer of the melt layer can achieve an improvement of (adhesive) bonding to the wood-based material, because penetration of the wood-based material by the polymer of the melt layer is improved.

In order to achieve an ideal result, the MFI value selected for the thermoplastic polymer of the melt layer can depend on the nature of the wood-based material. As MFI values increase, flow depths of the polymer into the wood-based material and adhesion values of the edging strip are increased, and therefore improved. Greater flow depth has the advantage that the cracks usually present in practice in the surface material of the furniture panel are filled more satisfactorily by the inflowing melt-layer material. The resistance of the edge-banded panels of the invention to water and to water vapor is thus increased, and the risk of swelling of the wood-based panels is thus reduced.

In a particularly preferred embodiment, the melt layer of the edging strip of the invention comprises a mixture or combination of thermoplastic polymers which are composed of nonpolar monomer units and have various melt flowing indices. In a particularly preferred embodiment here, the melt flow index of one of the polymer components of the melt layer is about 50 to about 200 g/10 min, preferably 100 g/10 min or higher, particularly preferably from 100 to 200 g/10 min (in accordance with ISO 1133, 230° C., 2.16 kg) and the melt flow index of the other is about 1000 to 1500 g/10 min, preferably 1200 g/10 min. (in accordance with ISO 1133, 230° C., 2.16 kg).

It is particularly preferable that the melt flow index (MFI) of the mixture or combination of thermoplastic polymers which are composed of nonpolar monomers units is 200 g/10 min or higher, preferably in the range from 400 g/10 min to 1000 g/10 min (in accordance with ISO 1133, 230° C., 2.16 kg).

The desired MFI of the melt layer can be established by selecting a suitable mixing ratio of the various polymers with different MFI. An example of a preferred mixing ratio is a homopolypropylene (MFI 1200): homopolypropylene (MFI 120) ratio of 25:75.

By using this type of mixture of polymers with various melt flow indices it is possible to achieve ideal matching of the edging strip to various wood-based materials. "Ideal matching" means control of the flowability of the melt layer of the edging strip of the invention and, associated therewith, improvement of the adhesion of the edging strip on the edge of the furniture panel.

An important factor here is the pore size of the respective wood-based material. The greater the pore size of the respective wood-based material, the greater the opportunity for improvement of (adhesive-)bonding of the edging strip of the invention via an increase in the proportion of the polymer with the higher melt flow index: by way of example, the cavities that must be filled by the melt of the melt layer are significantly larger in particle board than in MDF (medium-density fiberboard). Ideal (adhesive-)bonding to wood-based materials with relatively high pore density can be achieved by selecting a polymer with higher melting point index, or by shifting the mixing ratio of two polymers toward the polymer with higher melting point index. This increases the flowability of the melt layer and at the same time improves the penetration depth of the polymer into the wood-based material. There is thus a control method available which can be used for individual optimization of the edging strip of the invention in respect of particular wood-based materials.

The edging strips of the invention thus achieve better (adhesive-)bonding performance than the edging strips described in the prior art in respect of the wood-based materials, without any need to use expensive graft copolymers.

The advantage of use of mixtures or combinations of polymers with different MFI values in the melt layer is that with polymers having different MFI values it is possible to influence not only the penetration depth but also the adhesion of the edging to the panel. Increasing MFI values of these mixtures or combinations not only increase, and thus improve, flow depths and adhesion properties but also improve controllability of flow depths and adhesion properties. The advantages of the edging strip of the invention become even more apparent with the mixtures or combination of polymers with different MFI values in the melt layer: namely that the cracks usually present in practice in the surface material of the panel can be more satisfactorily filled by the inflowing melt-layer material. At the same time, the residual thickness of the melt layer sometimes decreases significantly with increasing MFI of the material of which the melt layer is composed, because flow of the melt layer is improved (see FIGS. 1 to 3). This produces a larger "melt bead" between panel and edging strip, and said bead in turn has an advantageous effect on the sealing of the panel by the edging. The resistance of the edge-banded panels to water and to water vapor can thus be increased, and the risk of swelling of the wood-based panels can thus be reduced.

However, the abovementioned two effects can also have adverse results. Excessive flow of the melt layer can, under the influence of gravity, lead to a "melt bead" of different size on the upper side and the underside of the wood-based panel provided with the edging strip. At the underside, the material of the melt layer flows downward away from the panel, and formation of the "melt bead" at the underside of the panel is inadequate. The result can be that sealing, and thus resistance to swelling caused by water and in particular caused by water vapor, is less effective at the underside than at the upper side. It has therefore been found to be advantageous that the residual thickness of the melt layer present on the panel provided with the edging strip is >0.02 mm, preferably >0.05 mm, particularly preferably >0.08 mm, very particularly preferably >0.1 mm. This also permits better compensation of structural or surface differences at the edge of the wood-based panel. Stresses between panel and plastics edging (caused by way of example by different usage temperatures and storage temperatures) are moreover absorbed, thus improving suitability for long-term use. The residual thickness of the melt layer can be controlled via selection or combination of thermoplastic polymers of the polymer basis of the melt layer with suitable MFI values.

The term "bonding" means for the purposes of the invention that on application of the edging strip of the invention to the furniture panel the polymers of the molten melt layer penetrate into the cavities and pores present in the wood-based materials, and on cooling solidify in such a way that these cavities and pores have been filled with the free-flowing polymer, preferably completely filled. This gives not only a coherent bond of the conventional adhesive-bonding type but also an interlock bond between the edging strip, in particular its melt layer, and the wood-based material of the furniture panel. At the same time, it can also be possible that the nonpolar polymer basis of which the melt layer is composed forms a welded bond with the lignin present in the wood-based panel, since lignin also has thermoplastic properties.

Because the edging strip of the invention comprises no polar groups and preferably also no reactive groups in the polymer basis of the melt layer, the bonding of the edging strip of the invention, in particular its melt layer, is preferably predominantly interlock bonding, particularly preferably exclusively interlock bonding.

Advantages arise from the additional or predominant or exclusive interlock bonding between the edging strip and the wood-based material of the furniture panel. In particular, the adhesion of the edging strip of the invention to the furniture panel is increased to such an extent that it is generally no longer possible to achieve non-destructive peeling of the edging strip from the furniture component. At the same time, sealing of the edge region of the furniture panel is improved, thus increasing the resistance to water and to water vapor of the panels edge-banded of the invention, and thus reducing the risk of swelling of the wood-based panels.

Another advantage of the edging strip of the invention is that recycling properties are greatly improved. Edging strips for furniture panels usually have an upper or decorative layer composed of a homopolymer, for example polypropylene. When an edging strip is produced with this type of upper or decorative layer made of polypropylene and a melt layer based on a graft copolymer a mixture of materials is produced which renders recycling of such edging strips difficult or indeed impossible. In contrast, it is possible to design the edging strip of the invention in such a way that the upper or decorative layer and the functional melt layer are based on the same polymer, thus permitting easy recycling of the composite strip.

Another preferred embodiment of the invention provides an edging strip comprising a melt layer whose polymer basis is composed of a mixture or combination of at least two polymers of polypropylene or a combination of at least one homopropylene and at least one copolymer of propylene, where the melt layer optionally comprises other components, in particular in the form of pigments, fillers and additives.

It is preferable that the various homopolypropylene s and copolymers of propylene present in said combination have different melt flow indices (MFI), where the melt flow indices of the homopolypropylenes are in the range from 100 g/10 min to 1500 g/10 min, preferably in the range from 100 g/min to 1200 g/10 min (in accordance with ISO 1133, 230° C., 2.16 kg) and the melt flow indices of the copolymers of propylene are 3 g/10 min or greater, preferably 50 g/10 min or greater, particularly preferably 100 g/10 min or greater (in accordance with ISO 1133, 230° C., 2.16 kg).

It is particularly preferable that the melt flow index (MFI) of the mixture or combination of homopolypropylenes and copolymers of propylene is 100 g/10 min or higher, preferably 200 g/10 min or higher, particularly preferably in the range from 400 g/10 min to 1000 g/10 min (in accordance with ISO 1133, 230° C., 2.16 kg).

In a very particularly preferred embodiment, the copolymers used in this mixture or combination are copolymers of ethylene and propylene.

The combination of homopolypropylenes with copolymers based on polypropylene and polyethylene in the melt layer of the edging strip of the invention has a number of advantages.

By using the combination of homopolypropylenes with copolymers based on polypropylene and polyethylene it is possible to reduce the modulus of elasticity of the melt layer. Modulus of elasticity is a property used in materials technology which describes the relationship between stress and strain on deformation of a solid body with linear elastic behavior. Modulus of elasticity increases as resistance of a material to elastic deformation increases. A melt layer made of a material with high modulus of elasticity is therefore stiffer and sometimes more brittle than a melt layer composed of a material with low modulus of elasticity. A reduction of modulus of elasticity through combination of homopolypropylenes with copolymers based on polypropylene and polyethylene in the melt layer therefore leads to higher flexibility of the edging strip, in particular of the melt layer per se.

The melt layer of the edging strip of the invention can by way of example use homopropylenes whose modulus of elasticity is 1500 MPa. The modulus of elasticity of the polypropylene-polyethylene copolymers used is by way of example 700 MPa. By selecting a suitable mixing ratio of homopolypropylene to polypropylene-ethylene copolymer, it is preferably possible to reduce the modulus of elasticity of the melt layer to 1400 MPa or less, 1200 MPa or less, 1000 MPa or less, preferably 950 MPa or less, or particularly preferably to 800 MPa or less.

This is in particular important when temperature variations occur. The coefficients of thermal expansion of the wood-based panel and of the edging strip are different. Temperature variations therefore result in different expansion of the material of the wood-based panel and the upper layer of the edging strip, bonded to the melt layer. This can lead to stresses in the edging strip and to increased exposure of the melt layer of the edging strip to tensile forces. In conventional edging strips, frequently occurring temperature variations can progressively lead to at least some breakage of the bond between the edging strip and the wood-based panel, and thus progressively to peeling of the edging strip from the wood-based panel. Water and water vapor can thus penetrate into the wood-based panel. These disadvantages can be overcome by using the edging strip of the invention whose melt layer has a reduced modulus of elasticity. By virtue of the greater elasticity of the melt layer, stresses and tensile forces arising during temperature variations at the edging strip can be absorbed more effectively by the edging strip, in particular its melt layer, and breakage of the bond between edging strip and wood-based panel can be minimized or prevented.

The greater flexibility of this type of edging of the invention also has advantages over conventional edgings in the processing of small radii. In addition to the measures described above and effects of addition of pigments and additional substances that absorb energy, preferably additional substances that absorb light and/or radiation and/or heat, mineral fillers or metal particles, the stiffness of the entire edging during processing, in particular for processing in small radii, is still further reduced by the increased flexibility of the melt layer, and a further improvement in deformability of the edging strip on application of the edging strip to the furniture panel is provided.

The application of edging strips to the edges of wood-based panels is carried out with exposure to pressure and temperature. When the edging strip, the melt layer of which has been melted with exposure to heat, for example by means of a laser, is pressed onto the material a portion of the molten material of the melt layer penetrates into the cavities and pores of the wood-based material; another portion escapes laterally at the upper and lower edges of the wood-based panel, and another portion of the material of the melt layer remains between wood-based material and the upper layer of the edging strip. After cooling and solidification, the material that has escaped laterally must be removed by milling, together with any projecting portions of the edging strip. When this material is removed by milling, the edges of the edging strip are simultaneously or subsequently subjected to a post-treatment to produce a visually acceptable transition between the surface of the furniture panel and the edging strip. This process frequently causes damage to conventional edgings having a higher modulus of elasticity. This damage can be reduced or prevented by using the edging strip of the invention with reduced modulus of elasticity.

The use of copolymers of the polyolefins of the melt layer also increases the impact resistance of the edging strip of the invention. It is thus possible, when comparison is made with conventional edging strips, to achieve a significant reduction of breakages occurring during machining and during use.

Finally, the use of copolymers of the polyolefins of the melt layer also reduces the melting point of the melt layer. This firstly provides still further improvement of the rheology of the material of the melt layer. The effects and advantages of improved rheology of the melt layer have already been described a number of times above. Secondly, less energy is required to melt the melt layer, with resultant large energy savings and, associated therewith, large cost savings during application of the edging strip of the invention to the edges of wood-based panels. Alternatively, it is possible to use an increased throughput velocity for bringing the edging strips into contact with the furniture panels in the production process, with a resultant increase in the productivity of the process for producing the furniture panels.

The melt layer of the edging strip of the invention can by way of example use homopolypropylenes whose melting point is 163° C. The melting point of the polypropylene-polyethylene copolymers used is by way of example 130° C. The melting point of the melt layer can preferably be reduced to 160° C. or below, preferably 150° C. or below, or particularly preferably to 140° C. or below, via selection of a suitable mixing ratio of homopolypropylene to propylene-polyethylene copolymer.

Another advantage of the edging strip of the invention is that it permits substantially better corner welding during application onto wood substrates. A weakness of the edging strips of the prior art is specifically that only a weak adhesive bond is achieved at the sites where the melt layer comprising both polar and nonpolar fractions in the structure of a molecule meets the nonpolar upper layer of another edging strip (i.e. a corner of the furniture component), because the polar and nonpolar fractions of the edging strips that meet are not mutually compatible. This point of weakness in the adhesive bond leads to reduced resistance to water and water vapor. When the edging strip of the invention is used, based on polyolefins composed only of nonpolar monomers both in the upper layer and in the underlayer, said incompatibilities do not arise when two edging strips meet, for example at the corner of a furniture component.

Better sealing of the surface is moreover achieved by the greater penetration depth of the polymer of the melt layer of the invention into the wood-based material. In particular, this achieves better resistance to water and to water vapor of the resultant processed material.

Another embodiment of the invention provides an edging strip comprising a melt layer which is composed of at least one free-flowing polyolefin, or whose polymer basis is composed of free-flowing polyolefin, and which comprises other components, in particular in the form of pigments, fillers and additives. The function of the additional components in the melt layer is by way of example to permit the required introduction of energy for melting the melt layer, or to provide partial or homogeneous coloring of the melt layer. Other additives, pigments or fillers can serve to improve the resistance of the edging strips to light, in particular to UV, or to improve the processing properties of the edging strips.

Examples of additives suitable as UV stabilizers are organic UV absorbers, for example benzophenones, benzotriazoles, oxanilides or phenyltriazines, or inorganic UV absorbers, for example titanium dioxide, iron oxide pigments, zinc oxide or HALS (Hindered Amine Light Stabilizers), for example 2,2,6,6-tetra-methylpiperidine derivates such as bis(2,2,6,6-tetramethyl-4-piperidyl) sebacate.

Antioxidants serve to prevent oxidative degradation of the thermoplastic polymers present in the melt layer. Examples of suitable antioxidants are sterically hindered amines (hindered amine stabilizers, HAS) from the group of the arylamines, sterically hindered phenol derivatives and phenol- and phosphite-based antioxidants such as the commercially obtainable products Irganox, Irgafos, Ethanox, Isonox and others.

For ideal melting of the melt layer it is possible to use additional substances that absorb energy, preferably additional substances that absorb light and/or radiation and/or heat, e.g. laser pigments, mineral fillers and metal particles. This has the advantage that the energy absorption and therefore the melting behavior of the melt layer can be matched specifically to the energy source, e.g. to the wavelength of the laser radiation.

Another embodiment provides an edging strip as in any of the abovementioned embodiments where a liquid coating which comprises additional substances that absorb energy, and is thermally and/or chemically dried and, respectively, crosslinked is applied onto the melt layer of the edging strip. To this end, the liquid coating can be applied to the melt layer either over the entire surface or else only in some areas or regions. It is thus possible to achieve melting of specific, spatially defined regions of the melt layer by the energy source during processing in such a way that the position of the bond between edging strip and furniture panel can likewise be precisely defined.

In order to provide better bonding while at the same time increasing the adhesion forces between the edging strip and wood-based materials, additives having functional groups or polar groups, e.g. maleic anhydride, or based on isocyanate can be admixed in a known manner with the melt layer. It is preferable that additives added to the melt layer to improve bonding while at the same time increasing the adhesion forces between the edging strip and wood-based materials have no polar groups.

In a particularly preferred embodiment, the melt layer comprises only additional components which do not have the function of improving bonding between the edging strip and the wood-based panel, i.e. of increasing the adhesion forces between the edging strip and the wood-based materials. The composition of the melt layer of the edging strip of the invention based on free-flowing polymers intrinsically achieves adhesion better than that of conventional edging strips on wood-based panels.

The edging strip of the invention can have a single-layer structure. In an alternate embodiment, the edging strip of the invention comprises two or more layers. In a preferred embodiment, the edging strip of the invention comprises an upper layer alongside the melt layer. This upper layer can by way of example take the form of decorative layer. In one particularly preferred embodiment, the upper layer comprises a homo- or copolymer of propylene. In a particularly preferred embodiment, the invention provides an edging strip comprising an upper layer which is composed of at least one thermoplastic polyolefin, or whose polymer basis is comprised of at least one thermoplastic polyolefin, and which optionally comprises other components, in particular in the form of pigments, fillers and additives.

During the processing of edging strips on furniture components with small radii it has been discovered that the high stiffness of thermoplastic edging materials tends to be problematic, and specifically because the edging exerts relatively high recovery forces. There is therefore only restricted scope in the prior art for achieving a tight joint between wood-based panel and edging. A controlled reduction in the stiffness of the edging during processing is achieved by adding, in the upper layer of the edging strip, additional substances that absorb energy and that lead to defined heat absorption and therefore to a temperature increase in the thermoplastic upper-layer material. This supplementary addition of energy-absorbing materials, which can also take the form of a coating, improves the stiffness for the entire edging during processing, in particular for processing in small radii, and provides easier deformation of the edging strip.

In a preferred embodiment of the invention, therefore, for ideal absorption of laser radiation and conversion of the laser radiation into heat and, respectively absorption of plasma energy introduced, pigments and additional substances that absorb energy have been added to the upper layers, preferably additional substances that absorb light and/or radiation and/or heat, mineral fillers or metal particles.

It is preferable that the thermoplastic polyolefin of the upper layer is a homo- or copolymer of ethylene, propylene and/or butylene. It is most preferable that the thermoplastic polyolefin is a homopolymer of propylene or copolymer of polypropylene and polyethylene.

The invention accordingly provides an edging strip which takes the form of multilayer, adhesive-free edging strip and has a melt layer which in the molten condition is extremely free-flowing, with hardness and melting point that can be comparable to those of the other layers, so that the entire edging strip has constant hardness and melting point. This layer can be melted via introduction of energy through, for example, laser radiation or plasma, and it is therefore possible to fix the edging strip to furniture panels without additional adhesive. In an embodiment of the invention, the melt layer has been colored.

Alternatively, however, the invention also provides an edging strip which takes the form of multilayer, adhesive-free edging strip and has a melt layer which in the molten condition is extremely free-flowing, with hardness and melting point that can be lower than those of the other layers. When the hardness of the upper layer of this type of edging strip is maximized, there are resultant advantages relating to the long-term usage properties of the edging strip, for example good scratch resistance. The advantages of a melt layer having higher elasticity and lower melting point have already been discussed above.

In one embodiment, the edging strip is composed of colored thermoplastic.

It is moreover possible to provide what are known as bulk patterning effects in the layers. Bulk patterning effects are known to be produced via coextrusion of the same polymer in a differently colored formulation or via inhomogeneous colorant distribution. The distribution of different colorings in the form of streaks provides an ideal visual reproduction of decorative wood effects.

Another preferred embodiment of the invention provides a two- or multilayer edging strip manufactured by coextrusion. The coextrusion of melt layer can take place in a process directly with the extrusion of the other layers and/or via subsequent post-coextrusion.

Lamination of the melt layer in a two-stage process has also been found to be advantageous. In the first manufacturing step, the melt layer is extruded in the form of film. This film is then laminated onto the reverse side of the edging strip. During this lamination, the strong bond between the layers is produced by heat and pressure in a polishing stack.

The melt layer can moreover be produced via a liquid (post-)coating, which becomes solid as a result of crosslinking or drying or cooling of the previously melted polymer basis. This type of two- or multilayer structure has the advantage that the melt layer, the intermediate layers and the upper layer can be formulated separately in accordance with their functions. The intermediate layers can function as adhesion promoters between incompatible polymers that cannot be combined via coextrusion (e.g. between ABS and PP).

The invention preferably proposes a two-layer edging strip composed of an upper layer of the abovementioned polymers and of a coextruded melt layer based on a free-flowing polymer whose chemical basis is the same as that defined above.

It is possible to use the same polymer basis in the upper layer and in the melt layer. It is thus possible to establish a high level of homogeneity of machining performance, of hardness and of softening temperature of the entire edging strip in such a way that it is not possible visually to discern any differences in color, gloss and/or structure in the product from machining of the edging strip after fixing on the furniture panel.

Another embodiment provides an edging strip as in any of the abovementioned embodiments where a liquid coating is applied onto the melt layer of the edging strip and comprises additional substances that absorb energy, and is thermally and/or chemically dried and, respectively, crosslinked. To this end, the liquid coating can be applied to the melt layer either over the entire surface or else only in some areas or regions. It is thus possible to achieve melting of specific, spatially defined regions of the melt layer by the energy source during processing in such a way that the position of the bond between edging strip and furniture panel can likewise be precisely defined.

Another preferred embodiment of the invention provides an edging strip as in any of the abovementioned embodiments where the melt layer has been coated with an adhesion promoter. The expression "adhesion promoter" means a liquid mixture which comprises the main components water and/or organic solvents, binders (e.g. EVA, PUR, PVC) and mineral fillers (e.g. silica). Crosslinking agents (e.g. isocyanates) can also be added in order to increase adhesion values.

Another preferred embodiment of the invention provides an edging strip as in any of the abovementioned embodiments where the melt layer and/or the intermediate layers has/have a foam structure, or a foam structure is produced on melting or on processing of the melt layer. The foam structure can be produced by either physical or chemical foaming of the polymer layer. It has been found that the energy absorption of the melt layer (e.g. after laser irradiation) is increased. It is thus possible, for the same quality of adhesive bonding, to reduce power (e.g. of the laser) and/or to increase the throughput rate of the joining process, and/or to reduce the concentration of the energy-absorbing additives. All of the abovementioned measures lead to reduced costs.

The present invention also provides a furniture panel coherently bonded and/or interlock-bonded to one of the edging strips described above. This furniture panel is preferably composed of wood, wood-based materials or wood-substitute materials. Alternatively, this type of furniture panel can also be composed of plastic, metal, one or more glasses, stone, ceramic or a combination thereof.

The present invention moreover also provides a process for the production of an edging strip of the invention. It is preferable to produce an edging strip of the invention by extrusion or coextrusion.

In an alternate embodiment, an edging strip of the invention can be realized by applying a melt layer of the invention, i.e. a melt layer composed of at least one thermoplastic polyolefin, onto an existing edging strip that does not yet have a melt layer, with the aim of permitting welding of same to a furniture panel.

The examples and drawings below provide still further explanation of the invention.

Figure 1:
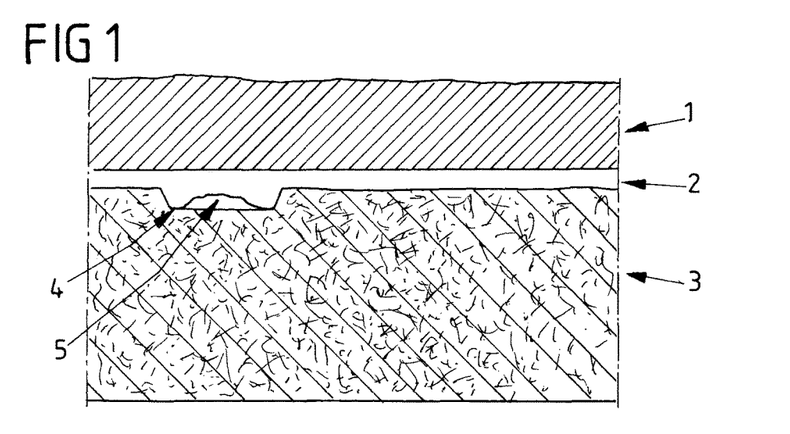
Figure 2:
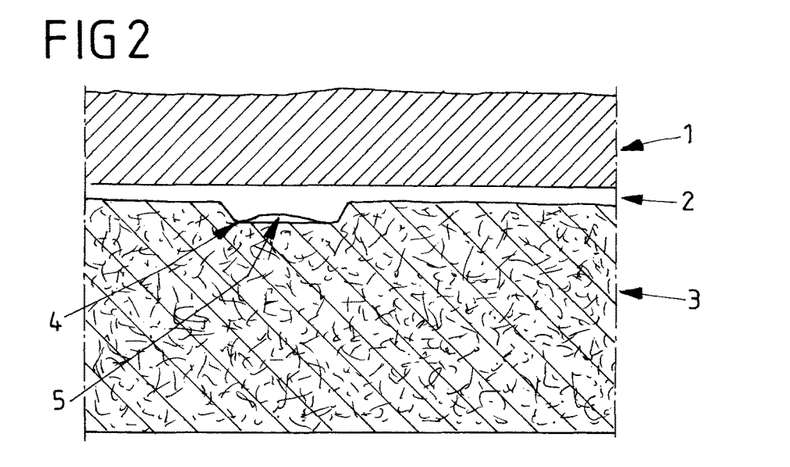
Figure 3:
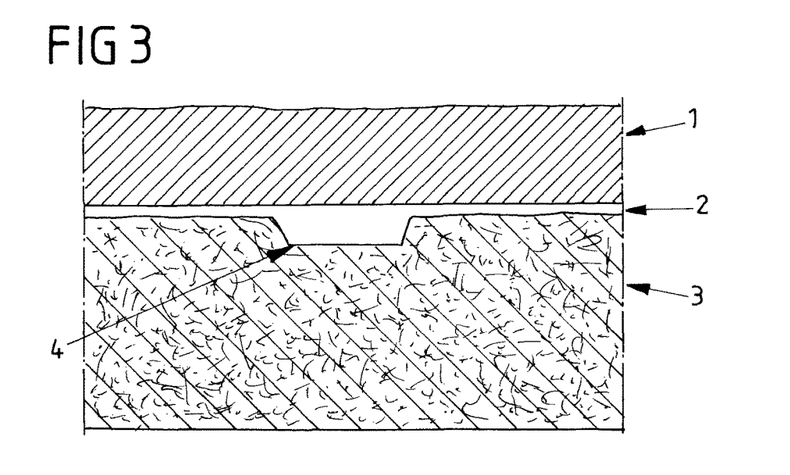

FIGS. 1 to 3 show an edging strip of the invention which has been applied to a wood-based panel 3. The wood-based panel 3 is a sheet of MDF. The edging strip comprises an upper layer 1 and a melt layer 2. A groove 4 (0.9×2.0 mm) has been milled into the wood-based panel 3 in order to determine the penetration depth of the molten melt layer 2 (see example 6).

EXAMPLES 1 TO 5

Eight colored edging strips, embodied as two-layer edging strips, comprise an upper layer and a lower layer.
PP Edging:
Upper Layer:
PP homopolymer
with/without PP copolymer (PP/PE)
with/without TPE elastomers
with/without fillers (chalk, talc, wollastonites, kaolin)
with/without pigments
with/without additives
Functional Layer:
$1^{st}$ example
90% of MFI 1200 PP homopolymer
10% of pigments/additives (IR absorbers)
$2^{nd}$ Example
50% of MFI 1200 PP homopolymer
40% of MFI 100 PP homopolymer
10% of pigments/additives
$3^{rd}$ Example
30% of MFI 1200 PP homopolymer
60% of MFI 100 PP homopolymer
10% of pigments/additives
$4^{th}$ Example
10% of MFI 1200 PP homopolymer
80% of MFI 100 PP homopolymer
10% of pigments/additives
$5^{th}$ Example
30% of MFI 1200 PP homopolymer
40% of MFI 100 PP homopolymer
20% of PP/PE copolymer
10% pigments/additives
$6^{th}$ Example
9% of MFI 1200 PP homopolymer
81% of MFI 120 PP homopolymer
10% of pigments/additives
$7^{th}$ Example
22.5% of MFI 1200 PP homopolymer
67.5% of MFI 120 PP homopolymer
10% of pigments/additives
$8^{th}$ Example
45% of MFI 1200 PP homopolymer
45% of MFI 120 PP homopolymer
10% of pigments/additives

EXAMPLE 6

Correlation Between Melt Layer MFI and Flow Distance and Adhesion Properties

Plastics edgings 1 to 3 were manufactured with the melt-layer formulations set out in table 1. The thickness of the melt layer is about 0.2 mm. Alongside the polymers listed, the melt layer was white-pigmented and comprised an IR absorber as additive. The edgings were processed in an edge-gluing machine using a diode laser assembly with power rating 25 J/cm$^2$.

TABLE 1 formulations of melt layers

| | | Formulation of functional layer | |
|---|---|---|---|
| Formulation No. | PP polymer | MFI (230° C./2.16 kg) in accordance with ISO 1133 [g/10 min] of the polymers used | Mixing ratio |
| 1 | A | 1200 | 10 |
|   | B | 120 | 90 |
| 2 | A | 1200 | 25 |
|   | B | 120 | 75 |
| 3 | A | 1200 | 50 |
|   | B | 120 | 50 |

Table 2 shows the results from testing of flow depth of the melt layer and from a roller-peel test. Flow depth was tested by preparing cross sections as in FIGS. 1 to 3 and studying these under a microscope using reflected light with an optical scale.

FIG. 1 shows a cross section through an edging strip whose melt layer 2 was produced by using formulation No. 1 (see table).

FIG. 2 shows a cross section through an edging strip whose melt layer 2 was produced by using formulation No. 2 (see table).

FIG. 3 shows a cross section through an edging strip whose melt layer 2 was produced by using formulation No. 3 (see table).

The wood-based panel 3 in FIGS. 1 to 3 is an MDF sheet of thickness 19 mm.

The depiction in FIGS. 1 to 3 is not to scale.

All of the tests were carried out three times or in each case with three parallel samples. The results set out in table 2 in each case represent the average values from the three tests.

TABLE 2 test results

| | Flow depth | | Roller peel test (100 mm/min) | |
|---|---|---|---|---|
| | Max. penetration depth | | | |
| Formulation No. | (0.9 × 2.0 mm groove in MDF sheet) [mm] | Groove fill level [%] | Average value of peel force for particle board [N] | Average value of peel force for MDF sheet [N] |
| 1 | 0.82 | 80 | 47 | 46.5 |
| 2 | 0.85 | 90 | 56 | 83.0 |
| 3 | 0.90 | 100 | 66 | 197.5 |

It can clearly be seen that not only the penetration depth but also the adhesion between the edging and the panel can be influenced/controlled by using polymers of different MFI values. As (mixture) MFI increases, flow depths and adhesion values are increased and thus improved.

The improvement of adhesion is particularly clear when MDF sheets are used as backing material. Greater flow depth has the advantage that the cracks generally present in practice in the surface material of the panel are filled more satisfactorily by the inflowing functional-layer material. This could be clearly seen in the case of the tests depicted in FIGS. 2 and 3, where the cavity 5 of the groove 4 was filled more satisfactorily (FIG. 2) or entirely (FIG. 3). The resistance of the edge-banded panels to water and to water vapor is therefore increased, and the risk of swelling of the wood-based panels is thus reduced. At the same time, there is in some cases a marked reduction of the residual thickness of the melt layer as (mixture) MFI increases, because of improved flow of the melt layer (see reduction of thickness of melt layer 2 in FIGS. 2 and 3 in comparison with FIG. 1). It could be observed here that a larger "melt bead" was produced between panel and edging, which in turn has an advantageous effect on the sealing of the panel by the edging.

KEY

1 Upper layer
2 Melt layer
3 Wood-based panel
4 Groove
5 Cavity

The invention claimed is:

1. The edging strip, in particular for furniture panels, comprising a melt layer composed of a mixture of free-flowing polyolefins selected from a combination of at least two homopolypropylenes or a combination of at least one homopolypropylene and at least one copolymer of propylene, where homopolypropylenes and copolymers of propylene present in said combinations have different melt flow indices (MFI), where the melt flow indices of the homopolypropylenes are in the range from 100 g/10 min. to 1500 g/10 min (in accordance with ISO 1133, 230° C., 2.16 kg).

2. The edging strip as claimed in claim 1, characterized in that the melt flow indices of the copolymers of propylene are at least 3 g/10 min. (in accordance with ISO 1133, 230° C., 2.16 kg).

3. The edging strip as claimed in claim 1, characterized in that the melt flow index (MFI) of the free-flowing polyolefin is at least 200 g/10 min. (in accordance with ISO 1133, 230° C., 2.16 kg).

4. The edging strip as claimed in claim 1, characterized in that the copolymers of propylene are copolymers of polypropylene and polyethylene.

5. The edging strip as claimed in claim 1, characterized in that the modulus of elasticity of the melt layer is no more than 1400 MPa.

6. The edging strip as claimed in claim 1, characterized in that the melting point of the melt layer is no more than 160° C.

7. The edging strip as claimed in claim 1, characterized in that the melt layer includes a pigment, a filler, and an additive.

8. The edging strip as claimed in claim 1, characterized in that the edging strip has an upper layer bonded to the melt layer.

9. The edging strip as claimed in claim 1, characterized in that the melt layer is composed of same polyolefin as other layers of the edging strip that are present.

10. The edging strip as claimed in claim 1 having an upper layer composed of a polyolefin selected from a homopolypropylene, a copolymer of propylene, or a combination thereof.

11. The edging strip as claimed in claim 1, characterized in that hardness and melting point of the melt layer is about the same as that of other layers of the edging strip that are present, and the edging strip has a constant melting point.

12. The edging strip as claimed in claim 1, characterized in that the thickness of the edging strip is in the range of about 0.3 to 4 mm, and visible upper side of the edging strip has been laminated with a plastics foil or with a metal foil, and/or has been embossed and/or printed and/or coated.

13. The edging strip as claimed in claim 1 having bulk patterning.

14. The edging strip as claimed in claim 1, characterized in that an intermediate adhesion promoter is present between incompatible polymer layers that cannot be coextruded.

15. The edging strip as claimed in claim 1, characterized in that an adhesion promoter is present between the melt layer and other layers that are present.

16. The edging strip as claimed in claim 1, characterized in that the same polymer is present in an upper layer and in the melt layer, and provides homogeneity of subsequent machining performance, of hardness and of softening temperature for the entire edging strip.

17. The edging strip as claimed in claim 1, characterized in that a pigment and additional substance that absorbs energy are present in the melt layer.

18. The edging strip as claimed in claim 1, characterized in that a pigment and an additional substance that absorbs energy are present in upper layers that are present.

19. The edging strip as claimed in claim 1, characterized in that an adhesion promoter is present the melt layer and is composed of a liquid mixture comprising water and/or organic solvents, binders and mineral fillers.

20. The edging strip as claimed in claim 1, characterized in that the melt layer and/or an intermediate layer has/have a foam structure.

21. A furniture panel with an edging strip as claimed in claim 1, characterized by an adhesive bond between the melt layer and an edge of the furniture panel.

22. The furniture panel as claimed in claim 21, characterized in that the furniture panel is composed of wood, wood-based materials, wood-substitute materials, plastic, metal, glasses, stone, ceramic or a combination thereof.

23. Adhesive thermoplastic composition suitable for producing a melt layer of an edging strip and comprising a free flowing mixture of polyolefins having different melt flow indices (MFI) and consisting of non-polar monomers, the mixture having a melt flow index (MFI) of at least 100 g/10 min. and the polyolefins being selected from the group consisting of a combination of copolymer of propylene and a homopolypropylene, and a combination of at least two homopolypropylenes, the polyolefins present in said combinations having different melt flow indices.

* * * * *